US012607570B2

(12) United States Patent
Brekerbohm et al.

(10) Patent No.: US 12,607,570 B2
(45) Date of Patent: Apr. 21, 2026

(54) SENSOR ARRANGEMENT FOR ARRANGEMENT ON A MEASUREMENT CHAMBER, APPARATUS FOR QUALIFYING A MASK AND METHOD FOR QUALIFYING A MASK

(71) Applicant: Carl Zeiss SMT GmbH, Oberkochen (DE)

(72) Inventors: Lutz Brekerbohm, Hardegsen (DE); Ulrich Matejka, Jena (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 188 days.

(21) Appl. No.: 18/591,212

(22) Filed: Feb. 29, 2024

(65) Prior Publication Data
US 2024/0302290 A1 Sep. 12, 2024

(30) Foreign Application Priority Data
Mar. 9, 2023 (DE) .................... 10 2023 202 135.8

(51) Int. Cl.
*G01N 21/95* (2006.01)
(52) U.S. Cl.
CPC ....... *G01N 21/95* (2013.01); *G01N 2201/023* (2013.01)
(58) Field of Classification Search
CPC ........................ G01N 21/95; G01N 2201/023
See application file for complete search history.

(56) References Cited

U.S. PATENT DOCUMENTS

| | | | |
|---|---|---|---|
| 6,209,484 B1 * | 4/2001 | Huang | H01L 21/76829 |
| | | | 257/E21.252 |
| 6,429,897 B2 | 8/2002 | Derndinger et al. | |
| 12,158,706 B2 * | 12/2024 | Van de Kerkhof | |
| | | | G03F 7/70875 |
| 2006/0215137 A1 | 9/2006 | Hasegawa et al. | |
| 2012/0006258 A1 | 1/2012 | Schasfoort et al. | |
| 2013/0335552 A1 | 12/2013 | Feldmann et al. | |
| 2014/0330422 A1 | 11/2014 | Ranish | |
| 2016/0019689 A1 | 1/2016 | Inoue | |
| 2016/0061704 A1 | 3/2016 | Deguchi et al. | |
| 2017/0243722 A1 | 8/2017 | Leeser | |
| 2018/0128647 A1 | 5/2018 | Kim et al. | |
| 2020/0350200 A1 | 11/2020 | Humbert et al. | |
| 2020/0401037 A1 | 12/2020 | Huang et al. | |
| 2024/0298082 A1 | 9/2024 | Brekerbohm | |

FOREIGN PATENT DOCUMENTS

| | | |
|---|---|---|
| DE | 197 14 221 A1 | 4/1997 |
| DE | 10 2008 000 957 A1 | 10/2009 |
| DE | 10 2010 063 337 A1 | 6/2012 |

(Continued)

OTHER PUBLICATIONS

DE_102013211475 (Year: 2014).*

(Continued)

*Primary Examiner* — Uzma Alam
*Assistant Examiner* — Fani Polyzos Boosalis
(74) *Attorney, Agent, or Firm* — Fish & Richardson P.C.

(57) ABSTRACT
A sensor arrangement for arrangement on a measurement chamber, wherein the sensor arrangement comprises: a sensor; an intake opening; an outlet; and a fluid connection between the intake opening and the outlet.

23 Claims, 5 Drawing Sheets

(56)            References Cited

FOREIGN PATENT DOCUMENTS

| DE | 102012218758 A1 * | 4/2014 | ........... G01N 27/121 |
| DE | 102013211475 A1 * | 12/2014 | ............ G01F 1/684 |
| DE | 10 2013 220 473 A1 | 5/2015 | |
| JP | 2006269942 A * | 3/2005 | ........... H01L 21/027 |
| JP | 2011-258950 A | 12/2011 | |
| JP | 102014217870 A1 * | 3/2016 | ............ G01F 1/684 |
| KR | 10-0452946 B1 | 10/2004 | |
| TW | 201505115 A | 2/2015 | |
| TW | 201739941 A | 11/2017 | |
| WO | WO 2009/121641 A1 | 10/2009 | |
| WO | WO-2024130209 A1 * | 6/2024 | ............. G01J 5/532 |

OTHER PUBLICATIONS

Office Action for corresponding Japanese Appln. No. 2024-034934, mailed on Apr. 10, 2025, 10 pages (with English translation).
GPTO—Office Action, with translation thereof, for DE 10 2023 202 135.8 dated Feb. 29, 2024.
TW—Office Action & Search Report, with translation thereof, for corresponding Appl No. TW113106913, dated Sep. 5, 2024.
Office Action in Canadian Appln. No. 3,230,224, mailed on Sep. 22, 2025, 4 pages.

* cited by examiner

Fig. 1

SENSOR ARRANGEMENT FOR ARRANGEMENT ON A MEASUREMENT CHAMBER, APPARATUS FOR QUALIFYING A MASK AND METHOD FOR QUALIFYING A MASK

CROSS-REFERENCE TO RELATED APPLICATION

This application claims benefit under 35 U.S.C. § 119 to German patent application DE 2023 202 135.8, filed on Mar. 9, 2023. The entire disclosure of this application is incorporated by reference herein.

FIELD

The present disclosure relates to a sensor arrangement for arrangement on a measurement chamber, to an apparatus for qualifying a mask and to a method for qualifying a mask.

BACKGROUND

In known sensor arrangements for arrangement on a measurement chamber, for example on a vacuum measurement chamber, particles and/or gases can enter, for example from the sensor arrangement into the measurement chamber, for example outgassing of an adhesive into the measurement chamber.

Certain known apparatuses and methods for qualifying a mask are used in lithography. In this case, a mask for use in lithography can be examined, via recording optical images, for example for defects and/or soiling in order to increase quality in a subsequent lithography process for producing semiconductor elements. A method for qualifying a mask can be carried out via an apparatus comprising a sensor arrangement. In sensor arrangements known from the prior art, it is possible for particles or contaminants from parts of the sensor arrangement and/or from the measurement chamber to be deposited on an optical sensor or on optical surfaces, for example on optical surfaces within the measurement chamber. This can cause undesired deposits to form on optical components and/or on a sensor, for example on an optical sensor, these undesired deposits having an adverse effect on the measurement result. The undesired deposits may be organic substances, for example. In addition to contaminants from the sensor arrangement, contaminants that do not originate from the sensor arrangement can alternatively or additionally become deposited on surfaces, for example a sensor surface. This may, for example, adversely affect measurement results of a method for qualifying a mask for use in lithography, for example the mask or optical components may be contaminated. This may have an adverse effect on, for example, the reliability of defect detection, such as in a manner accumulating over time. As an alternative or in addition, the mask that is intended to be qualified may be soiled by the known method, which would have a negative effect on a lithography result. As an alternative or in addition, a rate of false-positive defect detection operation may increase and/or existing defects may not be detected.

SUMMARY

The present disclosure seeks to provide a sensor arrangement for arrangement on a measurement chamber, an apparatus for qualifying a mask and a method for qualifying a mask, which sensor arrangement, apparatus and method reduce contaminants of the measurement chamber and/or the mask.

The disclosure proposes a sensor arrangement for arrangement on a measurement chamber. The sensor arrangement has a sensor. The sensor may be an optical sensor, such as an imaging sensor. The sensor may comprise, for example, a CCD (charge-coupled device) chip, a CMOS (complementary metal-oxide semiconductor) chip and/or a photodiode. The sensor may comprise a TDI (time delay and integration) sensor. The sensor arrangement may be a camera system, for example. The sensor arrangement has an intake opening and an outlet. The sensor arrangement has a fluid connection between the intake opening and the outlet. The intake opening can be designed to conduct a fluid out of the measurement chamber into the sensor arrangement, such as into a cavity in the sensor arrangement. The fluid may be a gaseous and/or liquid medium, for example air. The intake opening can be entirely or partially filled with a medium permeable to the fluid. The outlet can be designed to conduct a fluid out of the sensor arrangement via at least part of the fluid connection. The outlet can be configured as an opening. The outlet can be entirely or partially filled with a medium permeable to the fluid. The fluid connection is designed to conduct the fluid through at least part of the sensor arrangement. The fluid connection can be designed to conduct a fluid from the intake opening to the outlet. The fluid connection can be at least partially configured as a cavity. The fluid connection can be at least partially filled up with a medium permeable to the fluid.

The fluid connection can be designed to extract a medium from the measurement chamber by suction during operation of the sensor arrangement. The medium can be the fluid. The medium can comprise a gas, such as a gas mixture, and/or particles and/or contaminants.

The sensor arrangement can have an adhesive layer. The adhesive layer can be designed to connect two or more elements of the sensor arrangement to each other. The adhesive layer can form a barrier to soiling. The adhesive layer can be designed to prevent contaminants from moving toward the measurement chamber. The fluid connection can be designed to dissipate outgassings of the adhesive layer during operation of the sensor arrangement, for example to extract the outgassings by suction. This can suppress diffusion of the outgassings into the measurement chamber and/or outgassings of the adhesive layer can be conducted to the outlet via the intake opening and/or via the fluid connection.

The sensor arrangement can have a first section and a second section. The first section can have the outlet. The second section can have the intake opening and the sensor. In addition, the second section can have the adhesive layer. The fluid connection can connect the first section to the second section. The first section can be separated from the second section, for example, by one plane. In the case of arrangement of the sensor arrangement on the measurement chamber, the plane can be arranged on a wall of the measurement chamber. In the case of arrangement of the sensor arrangement on the measurement chamber, the first section of the sensor arrangement can be arranged substantially outside the measurement chamber. In the case of arrangement of the sensor arrangement on the measurement chamber, the second section of the sensor arrangement can project substantially into the measurement chamber. In the context of the present disclosure, expressions such as "first", "second", "third", such as for example in "first section", serve as pure designations, such as without reference to an order and without reference to the presence of another element of the mentioned type.

The sensor arrangement can comprise an electronics unit. For example, the first section can comprise the electronics unit. The electronics unit can comprise electrical connections and/or a cable harness and/or a control unit and/or an evaluation unit.

The first section can have a carrier plate. The second section can have a sensor carrier. The carrier plate can be designed to arrange the sensor arrangement on the measurement chamber. The carrier plate can be permanently or reversibly connected, for example, to a wall of the measurement chamber. The sensor arrangement can have, for example, a sealing element, such as a seal, for example an O-ring, and/or a fluid-tight adhesive layer and/or a fluid-tight coating. For sealing purposes, a seal, such as an O-ring, can be arranged between the carrier plate and a wall of the measurement chamber. The carrier plate can have an opening, for example a circular opening. At least part of the electronics unit can be accommodated in the opening. The carrier plate and/or the sensor carrier and/or the sensor can be arranged substantially parallel to each other. Here, substantially parallel can be understood to mean an angle between two elements of less than 30°, such as less than 10°, for example less than 1°. The adhesive layer can be arranged between the sensor carrier and the sensor. The adhesive layer can be designed to connect the sensor carrier to the sensor. The electronics unit can be connected, such as electrically connected, to the sensor via the sensor carrier or an opening in the sensor carrier and/or via a passage through the adhesive layer. The electronics unit can be of, for example, substantially cylindrical shape.

The second section can have the adhesive layer. The adhesive layer can be designed to prevent contamination from the first section, such as from the electronics unit, into the measurement chamber. As a result, the electronics unit would not have to be configured to be vacuum-suitable. This can reduce costs. A volume of the sensor arrangement, which has to be designed to be vacuum-suitable, can be reduced via the adhesive layer. The adhesive layer can shield elements of the sensor arrangement that are not vacuum-suitable.

The sensor arrangement can be designed to generate a decreasing pressure gradient from the first section to the second section, such as so that outgassings from the second section, such as from the adhesive layer, can be extracted by suction. The first section can have a first cavity. The second section can have a second cavity. A partial pressure in the first cavity can be lower than a partial pressure in the second cavity, such as during operation of the sensor arrangement. The sensor arrangement can be designed in such a way that a partial pressure in the first cavity can be lower than a partial pressure in the second cavity, such as during operation of the sensor arrangement. The first cavity can be, for example, part of the electronics unit. The second cavity can be, for example, a channel and/or the intake opening. The first cavity and/or the second cavity can be at least partially filled with a medium, for example with a porous medium. The second cavity can be arranged, for example, in the sensor carrier, such as in a porous material of the sensor carrier and/or in a cable bushing of the sensor carrier.

The sensor arrangement can have a plurality of sensors, such as a plurality of imaging sensors, such as a plurality of TDI sensors. The sensor arrangement can comprise, for example, a plurality of CCD (charge-coupled device) chips and/or a plurality of CMOS (complementary metal-oxide semiconductor) chips and/or a plurality of photodiodes. The sensor arrangement can have, for example, 2 to 100 sensors, such as 5 to 50, for example 10 to 30, sensors. The sensor arrangement can be configured in such a way that the plurality of sensors are each designed to record a partial image, wherein the partial images can be added after a time offset. This allows a field of view of the sensor arrangement to be increased when using small sensors and/or sensors to be able to be replaced individually in the event of wear. The sensor arrangement can have a plurality of TDI chips, wherein the TDI chips can be arranged in one plane, as far as possible without overlapping.

The sensor, for example the sensor arrangement, can be designed to detect radiation in the EUV range. The radiation can have a wavelength between 1 nm and 250 nm, such as between 10 nm and 100 nm, for example between 13 nm and 14 nm.

The sensor arrangement can have a first connecting element. The first connecting element can be connectable to a vacuum source. The first connecting element can be identical to the outlet.

The sensor arrangement can have a vacuum source. The vacuum source can be a pump. The vacuum source can be a vacuum system. The vacuum source can be designed to generate ultra-high vacuum. Ultra-high vacuum can be understood to mean a partial pressure of less than 10 pascals, such as less than 5 pascals, here. Ultra-high vacuum can be understood to mean a partial pressure of less than 100 nanopascals. The sensor arrangement can have, for example, a plurality of pumps, such as a primer pump and a main pump. The vacuum source can have one or more elements selected from a group comprising a lock valve pump, a rotary vane pump, a jet pump, a molecular pump, a turbomolecular pump, a cryopump and a sorption pump. The sensor arrangement can have an apparatus for heating. This can prevent dirt from entering a measurement chamber during operation.

The sensor arrangement can have a second connecting element. The second connecting element can be connected to the measurement chamber for operation under ultra-high vacuum. The second connecting element can be designed to permanently or reversibly connect the carrier plate to a wall of the measurement chamber. The connecting element can comprise an O-ring for sealing. The second connecting element can comprise, for example, a flange. The second connecting element can be designed to be screwed to the measurement chamber. The second connecting element can have one or more drill holes.

The sensor arrangement can comprise a flushing device for conducting a flushing flow of a flushing medium. The flushing device can comprise one or more elements selected from the group comprising a flushing medium source, a line for conducting the flushing medium, an outlet, such as a nozzle, for applying flushing medium to one of the sensors. The flushing medium can contain one or more gases selected from the group comprising helium, hydrogen, nitrogen, neon, argon, krypton, xenon and oxygen. The flushing medium may be pure gas. As an alternative to this, the gas may be a gas mixture. The flushing medium can be a gas mixture comprising helium and hydrogen. The flushing device can be designed to generate a constant flushing flow. The flushing device can be designed to generate a laminar flushing flow. The flushing device can be designed to direct a flushing current over at least part of the sensor, such as over sensor edges of the sensor. The sensor can be cleaned via the flushing flow. As an alternative or in addition, heat, for example from the sensor, can be dissipated via the flushing flow, such as to the first section of the sensor arrangement. This can improve functioning of the sensor. The intake opening can be designed to draw in the flushing medium. The fluid connection can be designed to direct the flushing flow from the intake opening to the outlet. The flushing flow can be designed to travel along with dirt and/or outgassings of the adhesive layer. The flushing device and/or the fluid connection can be designed to generate a vacuum in parts of the sensor arrangement. This can be used, for example, to extract contaminants and/or outgassings by suction, such as toward the outlet.

The sensor arrangement can have a first housing. At least part of the sensor arrangement can be integrated in the first housing. For example, the electronics unit and/or the carrier plate can be arranged at least partially in the first housing and/or mechanically connected to the first housing. For example, the first housing of the sensor arrangement can have the outlet. For example, the sensor arrangement can have a second housing. The second housing can, for example, at least partially comprise the sensor carrier and/or the sensor and/or the flushing device. In this way, extraction of contaminants and/or outgassings, for example from the electronics unit and/or from an adhesive layer of the sensor arrangement, by suction can be simplified.

The fluid connection can have one or more channels. The fluid connection can comprise, for example, an annular gap. The annular gap can comprise a constant gap width. The annular gap can have, for example, interruptions, such as for elements for stabilizing the sensor arrangement and/or for electrical connections. The annular gap can be formed between the cylindrical electronics unit and the carrier plate, such as by the electronics unit projecting into a circular opening in the carrier plate. The radius of the ring-shaped opening may be greater than the radius of the electronics unit, for example by 0.1 mm to 1 cm, such as by 0.5 mm to 2 mm, as an example by 1 mm.

The channel can have a cross section of at least 0.1 mm$^2$, such as at least 1 mm$^2$, for example at least 5 mm$^2$. The channel can be formed, for example, between the carrier plate and the electronics unit. As an alternative or in addition, the channel can be formed between a housing of the electronics unit and the carrier plate. The housing of the electronics unit and/or the electronics unit can be, for example, substantially tubular or can-shaped or cylindrical. As an alternative to this, the housing of the electronics unit and/or the electronics unit can be, for example, substantially cuboidal. The housing of the electronics unit can be connected to the sensor carrier, for example, via an adhesive layer. The housing of the electronics unit can be connected, for example, to the first housing of the sensor arrangement. The housing of the electronics unit can have openings for supplying electrical lines.

The sensor arrangement can have, for example, a third section. The third section can comprise a third cavity. The third cavity can be integrated, for example, into the housing of the electronics unit. A partial pressure in the third cavity can be higher than in the first cavity and/or in the second cavity, such as during operation of the sensor arrangement. The sensor arrangement can be configured in such a way that a partial pressure in the third cavity can be higher than in the first cavity and/or in the second cavity, such as during operation of the sensor arrangement. A partial pressure in a cavity of the first section can be higher than in a cavity of the second section. The third section can comprise the electronics unit. The sensor arrangement can have a further adhesive layer, such as between the housing of the electronics unit and the sensor carrier. The further adhesive layer can be configured in a ring shape, for example so that part of the electronics unit can be guided out through the adhesive layer to the sensor carrier. The third section can be separated, such as fluidically separated, from the first section and/or from the second section by a fluid-tight wall and/or by the housing of the electronics unit and/or by the further adhesive layer. As a result, it is not necessary for the electronics unit to be configured to be vacuum-suitable. The sensor arrangement can be configured in such a way that the partial pressure in the first cavity and/or the partial pressure in the second cavity can be adjusted in a managed manner, for example via the electronics unit. The sensor arrangement can be configured in such a way that the partial pressure in the first cavity and/or the partial pressure in the second cavity and/or the partial pressure in the third cavity can be adjusted in a managed manner, for example via the electronics unit. For example, the vacuum source can be designed to adjust and/or control partial pressures in cavities of the sensor arrangement. The vacuum source can be designed to generate and/or to manage different partial pressures in the first cavity and/or in the second cavity. The vacuum source can be designed to generate and/or to manage different partial pressures in the first cavity and/or in the second cavity and/or in the third cavity. The sensor arrangement can have, for example, a cooling device. The cooling device can comprise a Peltier element. The cooling device can be designed to cool the sensor. The fluid connection can be arranged in such a way that a fluid flow and/or a flushing flow passes over a warm side of the Peltier element, for example so that the heat is transported away to the outlet. As an alternative or in addition, the fluid connection can be configured in such a way that a fluid flow and/or a flushing flow passes over a cold side of the Peltier element, for example so that condensing moisture is transported away to the outlet. The fluid connection can be, for example, a gap between the sensor carrier and the cooling device, such as the Peltier element. The fluid connection can be designed to conduct moisture from the cooling device, such as a condensate, to the outlet. The fluid connection, such as the channels, can be arranged at least partially in the cooling device and/or in the sensor carrier. This can help allow heat and/or moisture and/or dirt to be dissipated from the sensor in a targeted manner.

For example, the sensor arrangement can be configured in such a way that partial pressures in the sensor arrangement can be managed in such a way that the electronics unit can have a partial pressure which is lower than the partial pressure of the measurement chamber. This means that the sensor and/or the sensor carrier and/or the cooling device, such as the Peltier element, might bend less, for example due to a lower pressure difference between the measurement chamber and the electronics unit.

The fluid connection can have one or more valves. The valves can be designed to prevent a fluid flow from the first section to the second section. This can help prevent contaminants from the sensor arrangement from entering the measurement chamber, for example when a vacuum source is switched off. The valve can be, for example, a non-return valve. As an alternative or in addition, the outlet and/or the fluid connection can have a device which is designed to close the outlet and/or the fluid connection if desired, such as in a fluid-tight manner, for example a fluid-tight slide. The fluid connection and/or the outlet can have, for example, a filter to filter fluid extracted by suction. The fluid connection and/or the outlet can have a device to analyze fluid extracted by suction, for example a mass spectrometer. This may indicate a source of soiling, such as a source of outgassing. The sensor arrangement can have one or more pressure sensors. This can help allow a fluid flow to be managed and/or controlled by the sensor arrangement.

In a further aspect, the disclosure can comprise an apparatus for qualifying a mask for use in lithography. The apparatus comprises a sensor arrangement according to the disclosure. By way of example, qualifying the mask can comprise examining the mask. As an alternative or in addition, qualifying the mask may comprise pretreating the mask, for example correction.

The mask may be a photolithographic mask, such as a photolithographic mask for a EUV wavelength range. The mask can comprise a plurality of layers, such as planar layers. The mask can have an absorber structure composed of absorbing pattern elements.

The apparatus for qualifying a mask can comprise an evaluation and control device and also a measurement chamber comprising an optical system. The evaluation and control device can have a separate evaluation device and a separate control device, wherein the two devices can be connected to each other via an interface. As an alternative to this, the evaluation and control device can be configured as one apparatus. The evaluation and control device can have a data processing apparatus. The evaluation and control device can be operated by a person, for example via an interface. This interface device can be, for example, a keyboard or a touchpad.

The optical system can have an illumination unit and an imaging unit. The illumination unit can be designed to apply light, such as illumination light, to the mask. The illumination unit can have an EUV light source. The imaging unit can be designed to image, in an image plane, light reflected by the mask.

The apparatus for qualifying a mask can have at least one housing of the apparatus for qualifying a mask. For example, the optical system can be arranged within the housing of the apparatus for qualifying a mask, such as entirely within the housing of the apparatus for qualifying a mask. The evaluation and control device can be arranged partially within the housing of the apparatus for qualifying a mask. For example, the evaluation and control device can be arranged entirely within the housing of the apparatus for qualifying a mask. As an alternative to this, the evaluation and control device can be arranged entirely outside the housing of the apparatus for qualifying a mask. For example, the sensor arrangement can be arranged at least partially within the housing of the apparatus for qualifying a mask.

The apparatus can have a device for storing the mask. The device for storing the mask can be designed to apply at least one flushing gas to the mask, such as a flushing gas as described above. As an alternative or in addition to the flushing device of the sensor arrangement, the device for storing the mask can also apply flushing gas to the sensor of the sensor arrangement. By using the sensor arrangement according to the disclosure, detection of defects on the mask can be improved via the apparatus.

In an aspect of the present disclosure, a method for qualifying a mask for use in lithography is proposed. The method comprises providing an apparatus for qualifying a mask, wherein the apparatus comprises a sensor arrangement according to the disclosure. The apparatus can comprise an evaluation and control device and also a measurement chamber. An optical system can be arranged in the measurement chamber. The sensor arrangement can comprise a sensor, an intake opening and an outlet. The sensor arrangement has a fluid connection between the intake opening and the outlet. The apparatus can have a vacuum source. The method further can comprise detecting at least one optical image of part of the mask via the sensor. The method can further comprise extraction of a medium from the measurement chamber by suction via the fluid connection, such as via the evaluation and control device. In a further step, one or more images generated via the sensor can be evaluated, such as via the evaluation and control device. In a further step, defect detection can be carried out, such as via the evaluation and control device. For example, a defect and/or soiling can be detected on the mask. In a further step, a repair of the mask can be carried out.

The sensor arrangement according to the disclosure for arrangement on a measurement chamber, the apparatus according to the disclosure for qualifying a mask and the method according to the disclosure for qualifying a mask, can have various features, at least in exemplary refinements. For example, reliability of qualification of a mask can be increased, such as by reducing outgassing of an adhesive layer into the measurement chamber and/or by extraction of dirt and/or moisture by suction and/or by transportation of heat out of the measurement chamber and/or out of the sensor arrangement.

It goes without saying that the abovementioned features and those explained hereinbelow can be used not only in the combination specified in each case but also in other combinations or on their own, without departing from the scope of the present disclosure. Exemplary embodiments of the disclosure are illustrated in the drawings and will be explained in more detail with reference to the following description.

BRIEF DESCRIPTION OF THE DRAWINGS

In the drawings:

FIG. 1 shows a schematic illustration of an exemplary embodiment of a sensor arrangement according to the disclosure;

DETAILED DESCRIPTION

Figure 1:
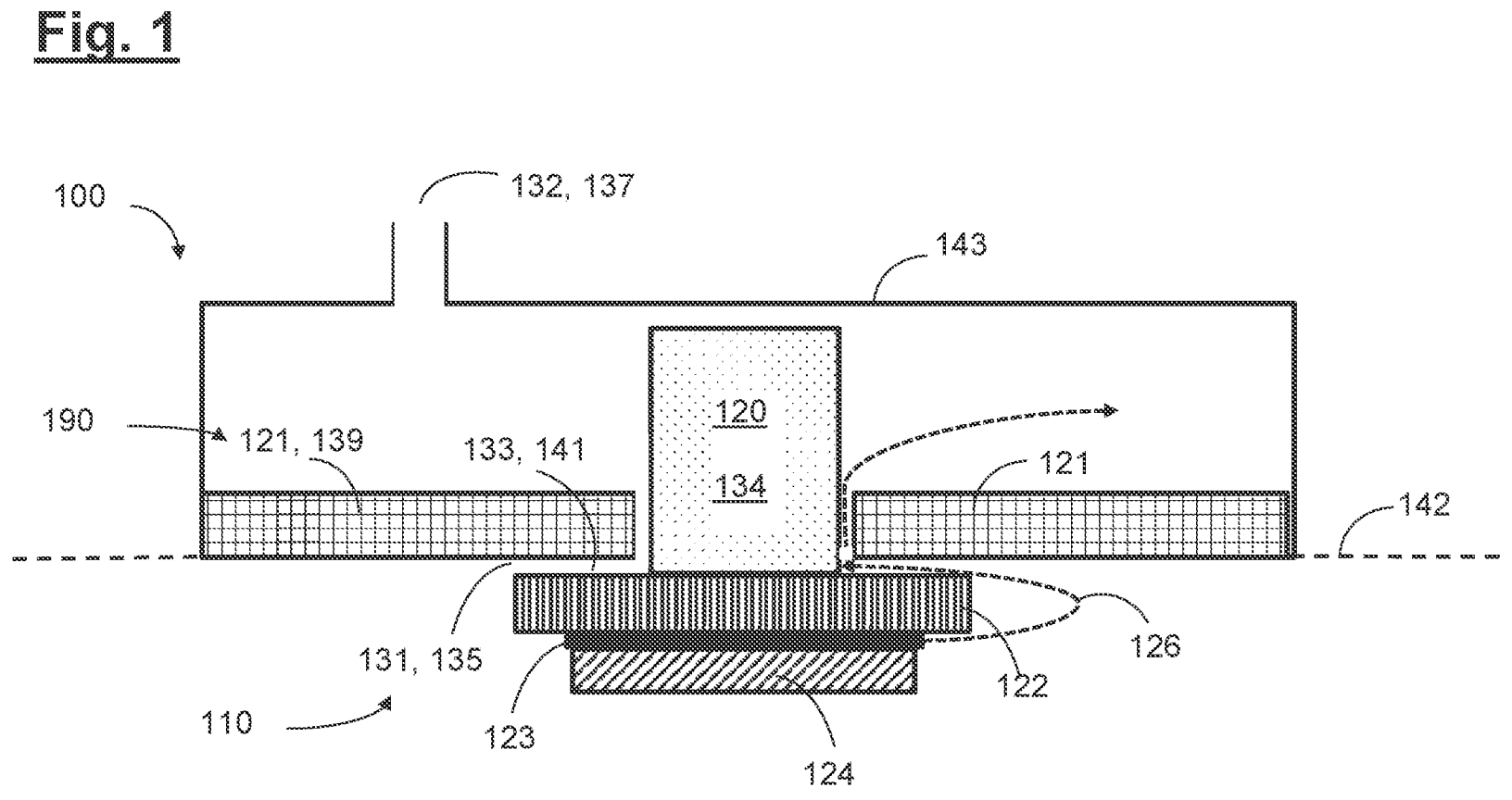
Figure 2:
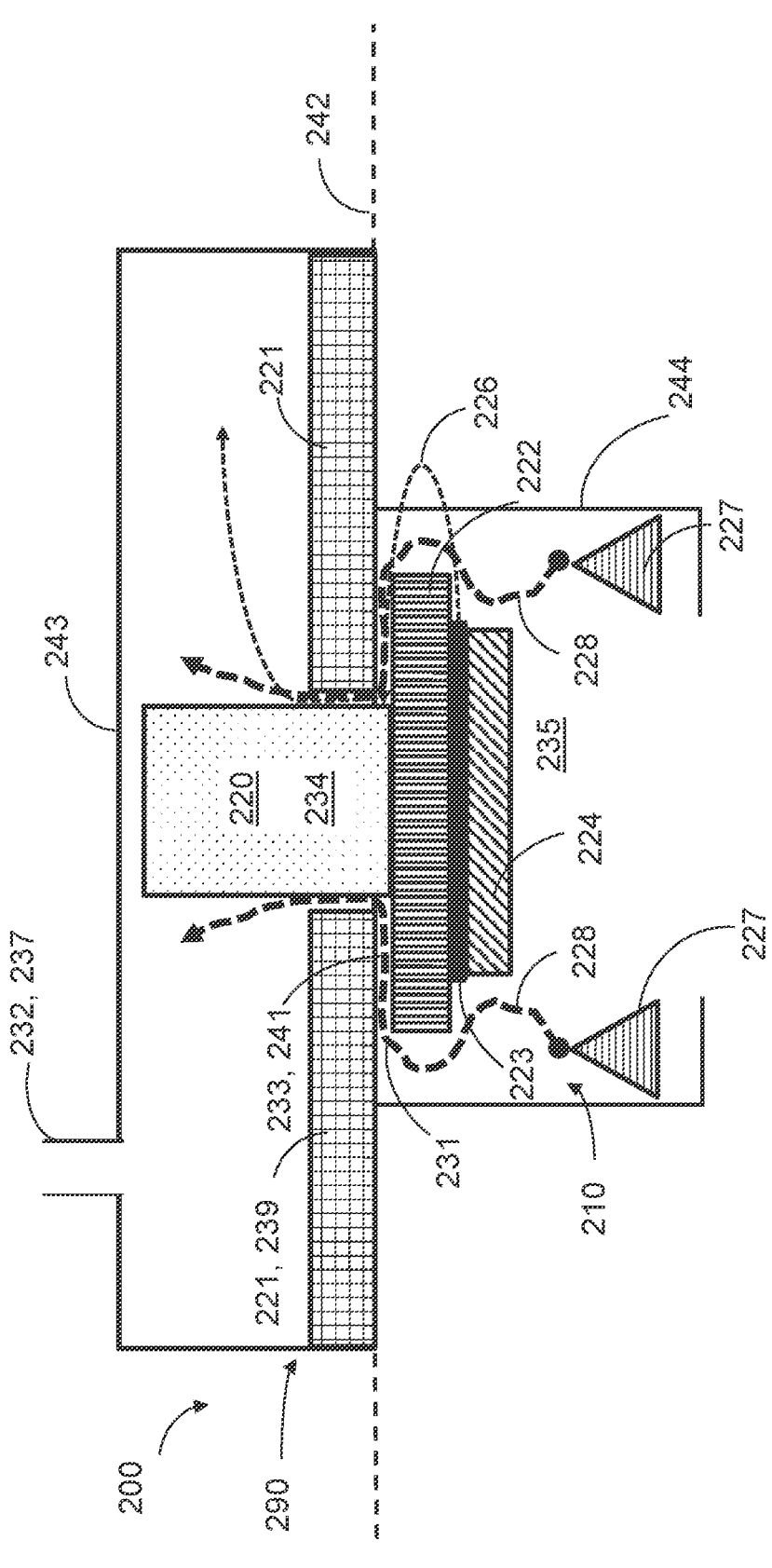
FIG. 2 shows a schematic illustration of an exemplary embodiment of a sensor arrangement according to the disclosure.

FIG. 1 shows a first exemplary embodiment of a sensor arrangement 100 according to the disclosure for arrangement on a measurement chamber. The sensor arrangement 100 has a sensor 124, an intake opening 131 and an outlet 132. The sensor arrangement 100 has a fluid connection 133 between the intake opening 131 and the outlet 132. The fluid connection 133 is designed to extract a medium from the measurement chamber by suction during operation of the sensor arrangement 100. The sensor 124 can be designed to detect radiation in the EUV range. The sensor arrangement 100 can have a plurality of sensors 124, such as a plurality of imaging sensors 124, for example a plurality of sensors 124 which can be designed to detect radiation in the EUV range.

The sensor arrangement 100 has an adhesive layer 123. The fluid connection 133 can be designed to extract outgassings 126 of the adhesive layer 123 by suction during operation of the sensor arrangement 100.

The sensor arrangement 100 has a first section 190 and a second section 110. In the embodiment illustrated in FIG. 1, the dashed line 141 marks a plane as the border between the first section 190 and the second section 110. The first section 190 comprises the outlet 132. The second section 110 has the intake opening 131 and the sensor 124. The fluid connection 133 connects the first section 190 to the second section 110.

The sensor arrangement 100 comprises an electronics unit 120. The first section 190 comprises the electronics unit 120. The first section 190 further comprises a carrier plate 121. The second section 110 comprises a sensor carrier 122. The sensor arrangement 100 can be designed to generate a decreasing pressure gradient from the first section 190 to the second section 110.

The first section 190 has a first cavity 134. The first cavity 134 can be comprised, for example, of the electronics unit 120. The second section 110 has a second cavity 135. The second cavity 135 can be the intake opening 131. A partial pressure in the first cavity 134 can be lower than in the second cavity 135, for example during operation of the sensor arrangement 100 on a measurement chamber under ultra-high vacuum.

The sensor arrangement 100 can have a first housing 143. The outlet 132 and/or the carrier plate 121 and/or the electronics unit 120 can be at least partially integrated in the first housing 143. As an alternative or in addition, the sensor arrangement 100 can have a second housing. The second housing can, for example, at least partially enclose the sensor carrier 122 and/or the sensor 124 and/or a flushing device. In this way, extraction of contaminants and/or outgassings, for example from the electronics unit 120 and/or from an adhesive layer 123 of the sensor arrangement 100, by suction can be simplified. A cavity of the first housing 143 can be the first cavity, for example. A cavity of the second housing can be the second cavity, for example.

The sensor arrangement 100 has a first connecting element 137. The first connecting element 137 can be connectable to a vacuum source. As an alternative to this, the sensor arrangement 100 can have a vacuum source, for example a pump. The sensor arrangement 100 has a second connecting element 139. In the exemplary embodiment according to FIG. 1, the second connecting element 139 is the carrier plate 121. The second connecting element 139 can be connectable to the measurement chamber for operation under ultra-high vacuum.

The fluid connection 133 has a channel 141. The channel 141 according to FIG. 1 is designed substantially as an annular gap. The annular gap can have, for example, interruptions, such as by elements for mechanical stabilization of the sensor arrangement 100 and/or by electrical connections. The channel 141 is formed from a gap between the electronics unit 120 and the carrier plate 121. The channel 141 can have a cross section of at least 0.1 mm², such as at least 1 mm², for example at least 5 mm². The fluid connection 133 can have one or more valves. The sensor arrangement 100 can have a cooling device.

The electronics unit 120 is substantially cylindrical. As an alternative to this, the electronics unit 120 can be substantially cuboidal. The electronics unit 120 is received into a circular opening in the carrier plate 121. The electronics unit 120 is connected to a sensor carrier 122, such as via electrical connections. The sensor carrier 122 is connected to the sensor 124 via an adhesive layer 123. The sensor 124 can be a TDI sensor. The sensor 124 can comprise a plurality of TDI sensors, for example. When a pump is connected to the outlet 132, a vacuum can be generated in the first section 190, which comprises the electronics unit 120, the outlet 132 and the carrier plate 121 and also at least parts of the first housing 143 of the sensor arrangement 100, the vacuum being able to generate a fluid flow from the second section 110, which comprises the sensor carrier 122, the adhesive layer 123 and the sensor 124, into the first section 190. This allows outgassings 126 of the adhesive layer 123 to be directed out of the second section 110 into the first section 190.

The exemplary embodiment of the sensor arrangement 200 according to FIG. 2 can be configured substantially like the exemplary embodiment according to FIG. 1. The exemplary embodiment according to FIG. 2 comprises a flushing device 227 for conducting a flushing flow 228 of a flushing medium. The flushing medium can contain one or more gases, selected from the group comprising helium, hydrogen, nitrogen, neon, argon, krypton, xenon and oxygen. The flushing device 227 can be configured, for example, as a ring-shaped nozzle arrangement. The flushing device 227 can be designed to enhance extraction of outgassings 226 from the adhesive layer 223 by suction. The flushing device 227 can be designed to direct the flushing flow 228 to edges of the sensor 224 and/or to an edge zone of the adhesive layer 223. This can intensify extraction of outgassings 226 from the adhesive layer 223 and/or of soiling of the sensor 224 by suction.

The sensor arrangement 200 can have a first housing 243. The outlet 232 and/or the carrier plate 221 and/or the electronics unit 220 can be at least partially integrated in the first housing 243.

The sensor arrangement 200 according to FIG. 2 comprises a second housing 244 of the sensor arrangement 200. The second housing 244 of the sensor arrangement 200 can, for example, at least partially enclose the sensor carrier 222 and/or the sensor 224 and/or the flushing device 227 and/or the adhesive layer 223. In this way, extraction of contaminants and/or outgassings 226, for example from the electronics unit 220 and/or from an adhesive layer 223 of the sensor arrangement 200, by suction can be simplified. A cavity of the first housing 243 can be the first cavity 234, for example. A cavity of the second housing 244 can be the second cavity 235, for example. During operation of the sensor device 200, a partial pressure in the first cavity 234, such as in the first housing 243, can be lower than in the second cavity 235, such as in the second housing 244.

Figure 3:
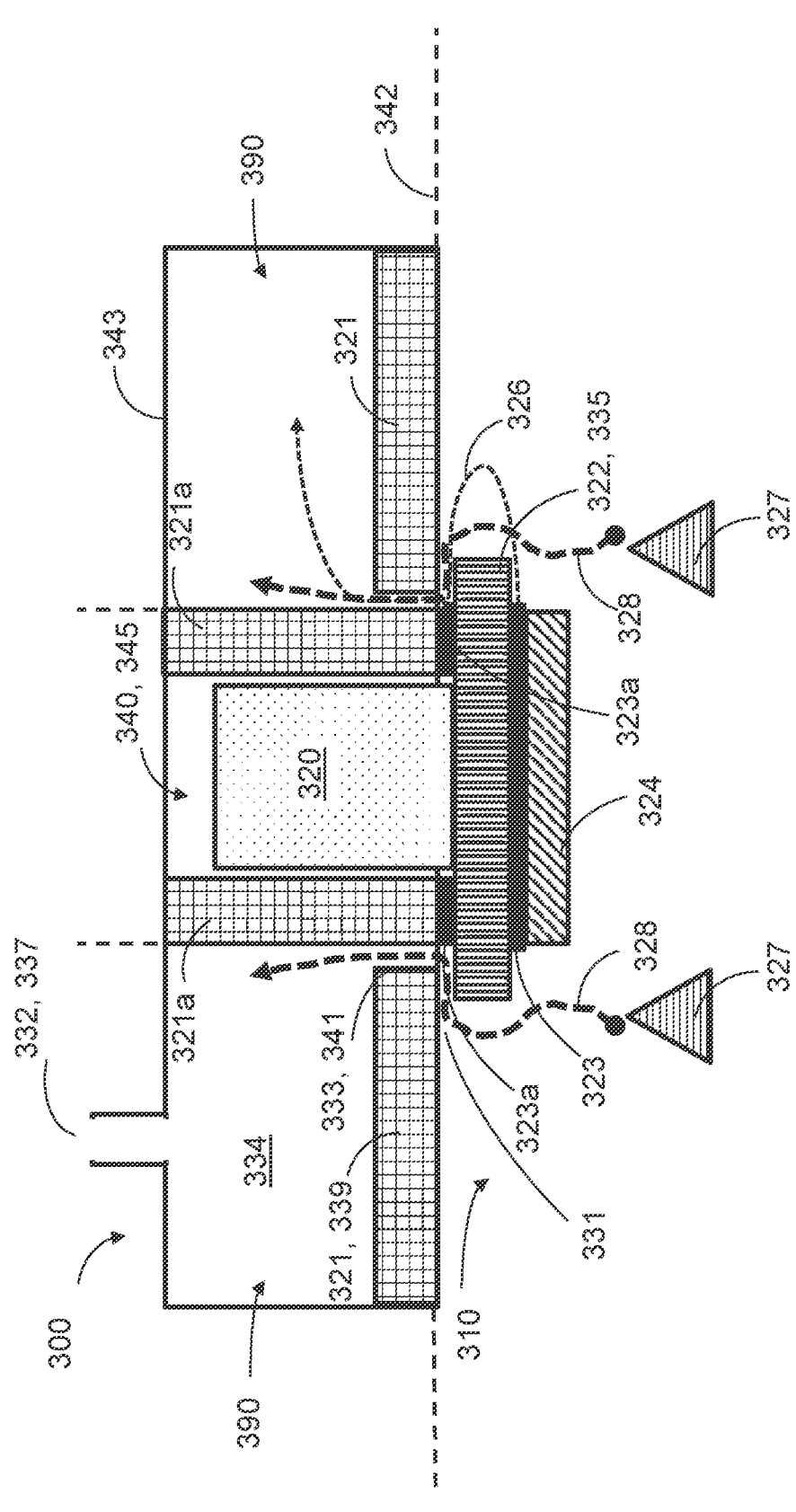
FIG. 3 shows a schematic illustration of an exemplary embodiment of a sensor arrangement according to the disclosure.

The exemplary embodiment of the sensor arrangement 300 according to FIG. 3 can be configured substantially like the sensor arrangements according to FIG. 1 and/or FIG. 2 and can, for example, also have components which are not illustrated in FIG. 3. The first section 390 comprises the carrier plate 321. The second section 310 comprises the sensor 324, the sensor carrier 322 and also the adhesive layer 323 which connects the sensor 324 to the sensor carrier 322.

The sensor arrangement 300 comprises a further adhesive layer 323a which can be designed to fluidically seal off a housing 321a of the electronics unit 320 with respect to the first section 390 and the second section 310, such as with respect to the sensor carrier 322. The sensor arrangement 300 has a third section 340. The third section 340 comprises the electronics unit 320. The sensor arrangement 300 has a first cavity 334 in a first section 390 and a second cavity 335 in a second section 310. The third section 340 can have a third cavity 345 which, during operation of the sensor arrangement 300, has a higher partial pressure than the first section 390 and the second section 310. The third cavity 345 can be at atmospheric pressure, such as during operation the sensor arrangement 300. The sensor arrangement 300 comprises a cooling device 342.

The sensor arrangement 300 can have a first housing 343. The outlet 332 and/or the carrier plate 321 and/or the electronics unit 320 can be at least partially integrated in the first housing 343. As an alternative or in addition, the sensor arrangement 300 can have a second housing. The second housing can, for example, at least partially enclose the sensor carrier 322 and/or the sensor 324 and/or the flushing device 327 and/or the adhesive layer 323. In this way, extraction of contaminants and/or outgassings, for example from the electronics unit 320 and/or from an adhesive layer 323 of the sensor arrangement 300, by suction can be simplified. A cavity of the first housing 343 can be the first cavity 334, for example. A cavity of the second housing can be the second cavity, for example. During operation of the sensor device 300, a partial pressure in the first cavity 334, such as in the first housing 343, can be lower than in the second cavity, such as in the second housing.

Figure 4:
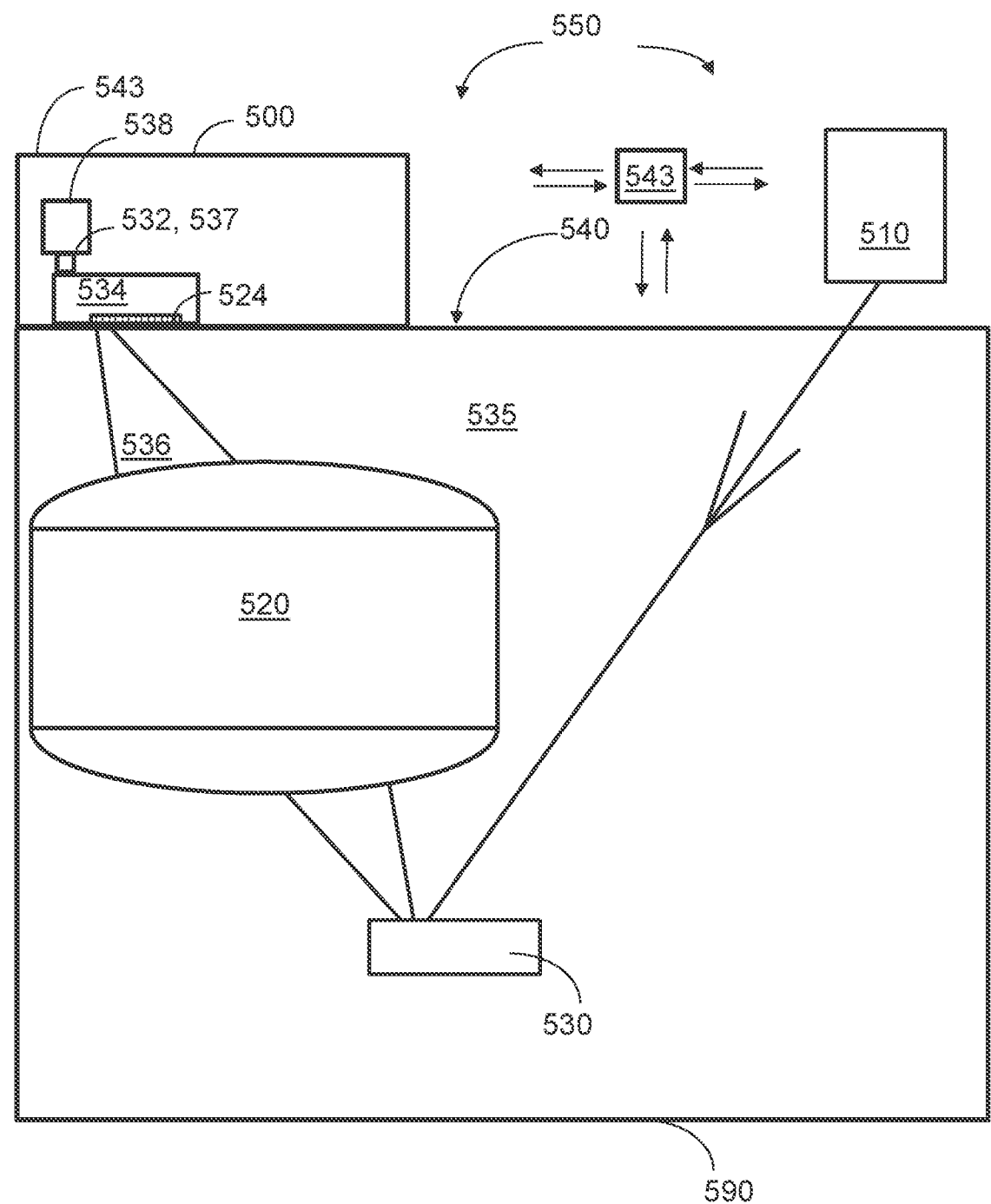
FIG. 4 shows a schematic illustration of an exemplary embodiment of an apparatus according to the disclosure for qualifying a mask.

FIG. 4 shows an exemplary embodiment of an apparatus 550 according to the disclosure for qualifying a mask 530 for use in lithography, wherein the apparatus 550 comprises a sensor arrangement 500 according to the disclosure. The sensor arrangement 500 can be configured like a sensor arrangement described above. FIG. 4 shows a sensor arrangement 500 which for example comprises a sensor 524 and an outlet 532. The sensor 524 can be designed to detect radiation in the EUV range 536. The outlet 532 is the first connecting element 537. The outlet 532 is connected to a vacuum source 538. The vacuum source 538 is integrated into the sensor arrangement 500, such as into a first housing 543 of the sensor arrangement 500. The apparatus 550 comprises an EUV source 510.

The device 550 comprises an evaluation and control device 543 and also a measurement chamber 540 comprising an optical system 520. The evaluation and control device 543 can be connected to the sensor arrangement 500 and/or to the EUV source 510 and/or to the optical system 520 via interfaces. The apparatus 550 has a housing 590. The housing 590 can delimit the measurement chamber 540, for example. The apparatus 550 can be designed to perform a method according to the disclosure for qualifying a mask 530.

Figure 5:
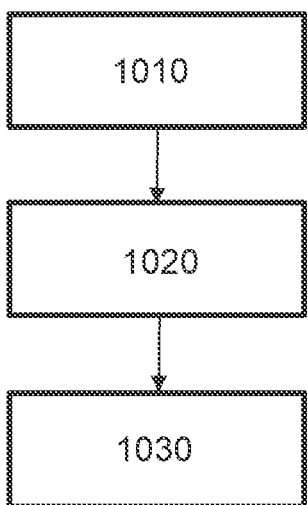
FIG. 5 shows a schematic representation of a method according to the disclosure for qualifying a mask.

FIG. 5 shows an exemplary embodiment of the method according to the disclosure for qualifying a mask for use in lithography. The method comprises providing 1010 an apparatus for qualifying a mask. The apparatus may be, for example, an apparatus 550 as illustrated in FIG. 4. The apparatus comprises, for example, a sensor arrangement according to the disclosure, as illustrated in FIG. 1, FIG. 2, FIG. 3 or FIG. 4 for example. The apparatus can have an evaluation and control device and also a measurement chamber comprising an optical system. The sensor arrangement comprises a sensor, an intake opening and an outlet. The sensor arrangement comprises a fluid connection between the intake opening and the outlet. The apparatus can have a vacuum source. In a further step 1020, at least one optical image of at least part of the mask is detected via the sensor. A plurality of images can be recorded, for example. In a further step 1030, a medium is extracted from the measurement chamber by suction via the fluid connection via the evaluation and control device. In a further step, an evaluation can be carried out via the evaluation and control device, for example defect detection can be carried out to identify defects or soiling of the mask.

LIST OF REFERENCE SIGNS

100, 200, 300, 500 Sensor arrangement
540 Measurement chamber
124, 224, 324, 524 Sensor
131, 231, 331 Intake opening
132, 232, 332, 532 Outlet
133, 233, 333 Fluid connection
123, 223, 323 Adhesive layer
126, 226, 326 Outgassings
190, 290, 390 First section
110, 210, 310 Second section
1010 Providing
1020 Detecting
1030 Extracting by suction
120, 220, 320 Electronics unit
121, 221, 321 Carrier plate
122, 222, 322 Sensor carrier
134, 234, 334, 534 First cavity
135, 235, 335, 535 Second cavity
536 Radiation in the EUV range
137, 337, 537 First connecting element
538 Vacuum source
139, 239, 339 Second connecting element
227, 327 Flushing device
228, 328 Flushing flow
141, 241, 341 Channel
342 Cooling device
530 Mask
543 Evaluation and control device
520 Optical system
550 Apparatus for qualifying a mask
142, 242, 342 Plane
323a Further adhesive layer
321a Housing of the electronics unit
340 Third section
510 EUV source
590 Housing of the apparatus for qualifying the mask
143, 243, 343, 543 First housing of the sensor arrangement
244 Second housing of the sensor arrangement
345 Third cavity

What is claimed is:

1. A sensor arrangement, comprising:
   a sensor;
   an intake opening;
   an outlet;
   an electronics unit; and
   a fluid connection between the intake opening and the outlet,
   wherein the sensor arrangement is configured to be arranged on a measurement chamber, and the fluid connection is configured to extract a gas from the electronics unit via suction so that the gas exits the sensor arrangement via the outlet.

2. The sensor arrangement of claim 1, further comprising an adhesive layer.

3. The sensor arrangement of claim 2, wherein the fluid connection is configured to extract outgassings of the adhesive layer via suction so that the outgassings exit the sensor arrangement via the outlet.

4. The sensor arrangement of claim 1, wherein:
   the sensor arrangement comprises first and second sections;

the first section comprises the outlet and the electronics unit;

the second section comprises the intake opening and the sensor; and the fluid connection connects the first section to the second section.

5. The sensor arrangement of claim 4, further comprising a carrier plate and a sensor carrier, wherein the first section comprises the carrier plate, and the second section comprises the sensor carrier.

6. The sensor arrangement of claim 4, wherein the sensor arrangement is configured to generate a decreasing pressure gradient from the first section to the second section.

7. The sensor arrangement of claim 4, wherein:

the first section comprises a first cavity;

the second section comprises a second cavity; and the sensor arrangement is configured so that, during use of the sensor arrangement, a partial pressure in the first cavity is less than a partial pressure in the second cavity.

8. The sensor arrangement of claim 7, further comprising a third section, wherein:

the third section comprises a third cavity; and the sensor arrangement is configured so that, during use of the sensor arrangement:

a partial pressure in the third cavity is greater than the partial pressure in the first cavity; and the partial pressure in the third cavity is greater than the partial pressure in the second cavity.

9. The sensor arrangement of claim 1, comprising a plurality of sensors.

10. The sensor arrangement of claim 1, wherein the sensor is configured to detect EUV radiation.

11. The sensor arrangement of claim 1, further comprising a connecting element connectable to a vacuum source.

12. The sensor arrangement of claim 1, further comprising a vacuum source.

13. The sensor arrangement of claim 1, further comprising a connecting element connected to the measurement chamber to achieve ultra-high vacuum during use of the sensor arrangement.

14. The sensor arrangement of claim 1, further comprising a flushing device configured to flow of a flushing medium.

15. The sensor arrangement of claim 14, wherein the flushing medium comprises at least one gas selected from the group consisting of helium, hydrogen, nitrogen, neon, argon, krypton, xenon and oxygen.

16. The sensor arrangement of claim 1, wherein the fluid connection comprises a channel.

17. The sensor arrangement of claim 16, wherein the channel has a cross section of at least 0.1 mm$^2$.

18. The sensor arrangement of claim 1, wherein the fluid connection comprises a valve.

19. The sensor arrangement of claim 1, further comprising a cooling device.

20. An apparatus, comprising:

a measurement chamber comprising an interior and an exterior; and a sensor arrangement arranged on the exterior of the measurement chamber, the sensor arrangement comprising:

a sensor;

an intake opening;

an outlet;

an electronics unit; and a fluid connection between the intake opening and the outlet, wherein the fluid connection is configured to extract a gas from the electronics unit via suction so that the gas exits the sensor arrangement via the outlet, and the apparatus is configured to qualify a lithography mask.

21. The apparatus of claim 20, further comprising:

an evaluation and control device; and an optical system, wherein the measurement chamber comprises the optical system.

22. A method of using an apparatus comprising a measurement chamber, a sensor arrangement, and an evaluation and control device, the measurement chamber comprising an interior and an exterior, the interior of the measurement chamber comprising an optical system, the sensor arrangement comprising a sensor, an intake opening, an outlet, an electronics unit and a fluid connection between the intake opening and the outlet, the sensor arrangement being arranged on the exterior of the measurement chamber, the method comprising:

using the sensor to detect an optical image of a lithography mask;

applying suction to the fluid connection to extract a gas from the electronics unit so that the gas exits the sensor arrangement via the outlet; and using the evaluation and control device to use suction to extract a medium from the measurement chamber via the fluid connection.

23. A sensor arrangement, comprising:

a sensor;

an intake opening;

an outlet; and a fluid connection between the intake opening and the outlet, wherein:

the sensor arrangement comprises first and second sections;

the first section comprises the outlet;

the second section comprises the intake opening and the sensor;

the fluid connection connects the first section to the second section;

the first section comprises a first cavity;

the second section comprises a second cavity;

the sensor arrangement is configured so that, during use of the sensor arrangement, a partial pressure in the first cavity is less than a partial pressure in the second cavity; and the sensor arrangement is configured to be arranged on a measurement chamber.

* * * * *